Oct. 25, 1966 P. M. WADDILL 3,281,213
ALKYLATION APPARATUS
Filed Feb. 18, 1963 3 Sheets-Sheet 1

INVENTOR.
P. M. WADDILL
BY
Young & Quigg
ATTORNEYS

Oct. 25, 1966 P. M. WADDILL 3,281,213
ALKYLATION APPARATUS
Filed Feb. 18, 1963 3 Sheets-Sheet 2

INVENTOR.
P. M. WADDILL
BY Young & Quigg
ATTORNEYS

Oct. 25, 1966  P. M. WADDILL  3,281,213
ALKYLATION APPARATUS

Filed Feb. 18, 1963  3 Sheets-Sheet 3

INVENTOR.
P. M. WADDILL
BY
Young & Quigg
ATTORNEYS

United States Patent Office 3,281,213
Patented Oct. 25, 1966

3,281,213
ALKYLATION APPARATUS
Paul M. Waddill, Bartlesville, Okla., assignor to Phillips Petroleum Company, a corporation of Delaware
Filed Feb. 18, 1963, Ser. No. 259,200
3 Claims. (Cl. 23—285)

This invention relates to the catalytic alkylation of hydrocarbons. In one aspect, this invention relates to an improved alkylation system in which cyclic flow of alkylation catalyst is provided. In another aspect, this invention relates to a novel feed distributor for introducing reactant hydrocarbons into an alkylation system.

One of the major problems associated with the catalytic alkylation of hydrocarbons lies in handling the alkylation catalyst, that is, transporting the catalyst through the various parts of the reaction and recovery system. The problem is particularly aggravated with acid catalysts, such as hydrofluoric acid, sulfuric acid, etc., which are used since these materials in many instances are highly corrosive to ordinary materials of construction. Special equipment such as alloy valves and vessels, special pumps and pump packings are required and special safety precautions are necessary in the alkylation of hydrocarbons with acid catalysts. Another problem associated with catalytic alkylation lies in the introduction of the reactant hydrocarbons, that is, the alkylatable hydrocarbon and alkylating agent into the acid catalyst so as to avoid overheating and polymerization of reactants, proper maintenance of a high alkylatable hydrocarbon to alkylating agent ratio, and the like.

The instant invention is particularly applicable to an alkylation system in which the reactants and acid are injected upwardly into an upright tubular reactor in which the isoparaffin is reacted with the olefin and from which the reaction product-acid emulsion flows into an acid settler, the acid is passed from the lower section of the settler through an acid cooler, which is connected with the inlet end of the reactor, and the reactant feed to the reactor is injected through an eductor-type feed distributor so as to effect the required flow of acid into the reactor. Thus, the entire flow through the system is produced by the injected feed.

Accordingly, an object of this invention is to provide an alkylation process whereby a high ratio of alkylatable hydrocarbon to alkylating agent is maintained.

Another object of this invention is to provide a novel reactant feed distributing device for introducing reactant hydrocarbons into an alkylation reactor so as to effect flow of acid catalyst through the reactor.

These and other objects of the invention will become more readily apparent from the following detailed description and discussion.

In accordance with the invention, a liquid mixture comprising an alkylatable hydrocarbon and an alkylating agent is introduced into an elongated alkylation reaction zone at a high velocity as a plurality of high velocity streams through constricted passageways of small cross-section relative to the reaction zone, the ends of the passageways terminating at different points along the line of flow in the reaction zone.

In accordance with this invention, for the alkylation of a compound alkylatable with an olefin in the presence of an alkylation catalyst comprising introducing a mixture of said compound and olefin into an elongated reaction zone at a velocity sufficient to maintain said catalyst therein and carrying said mixture of olefin compound and catalyst along said reaction zone until the alkylation is substantially complete, there is provided a feed distributing device for introducing reactant hydrocarbons, i.e., alkylatable hydrocarbon and alkylating agent at successive spaced-apart points in the direction of flow along the length of the elongated reaction zone.

Thus, in accordance with a principal aspect of the invention, the liquid hydrocarbon feed mixture of alkylatable hydrocarbon and alkylating agent is introduced upwardly into a reaction zone as a plurality of high velocity streams of small cross-section relative to said zone, said streams being introduced into said reaction zone at successive spaced-apart points downstream from the point of introduction of acid into the reaction zone so as to provide a high ratio of alkylatable hydrocarbon to alkylating agent throughout the reactor with a constant feed ratio.

In another aspect of the invention, a reactant hydrocarbon feed inlet distributor is provided which comprises a plurality of small cross-section tubular members of different lengths extending upwardly into the lower portion of a vertical upwardly extending elongated alkylation reaction zone so that reactants can be introduced into the reaction chamber at a plurality of spaced-apart points.

In general, any of the conventional catalytic alkylation reactions can be carried out by the method and with the apparatus of the present invention. Thus, the alkylation reaction can comprise reaction of an isoparaffin with an olefin or other alkylating agent, reaction of a normal paraffin with an olefin or other alkylating agent, or reaction of an aromatic hydrocarbon with an olefin or other alkylating agent; the reaction in each instance being carried out in the presence of a suitable alkylation catalyst. Suitable olefins include ethylene, propylene, butenes, pentenes, etc. Also operable are various other materials known to those skilled in the art, e.g., alcohols and ethers, such as isopropyl alcohol, tertiarybutyl alcohol, secondary butyl alcohol, isopropyl ether, and the like; likewise, the corresponding alkyl esters such as the alkyl halides, sulfates, phosphates, fluorides of the olefins, and the like can be used.

A wide variety of alkylation catalysts can be employed in the alkylation reaction, including well known catalysts, such as sulfuric acid, hydrofluoric acid, phosphoric acid; metal halides, such as aluminum chloride, aluminum bromide, and the like, and other liquid alkylation catalyts. The preferred catalyst is HF acid.

The alkylation reaction is carried out with the hydrocarbon reactants in the liquid phase; however, the reactants need not be normally liquid hydrocarbons. The reaction conditions can vary in temperature from sub-zero temperatures to temperatures as high as several hundred degrees Fahrenheit, and can be carried out at pressures varying from atmospheric to as high as 1000 p.s.i., and higher, and space velocities from about 0.1 to about 20.

While generally applicable to the alkylation of hydrocarbons, the present invention is particularly effective for the alkylation of low boiling olefins like propylene, butenes, isobutylene, pentenes, etc., with saturated branched chain paraffins such as isobutane, in the presence of hydrofluoric acid. In the alkylation of isoparaffins with olefins a substantial molar excess of isoparaffin to olefin is employed, usually to provide a feed ratio in excess of 1:1, usually from about 4:1 to about 20:1 and preferably about 10:1 to 15:1. The liquid volume ratio of total hydrocarbons to HF is in the range of 1.0:0.25 to 1:20, preferably about 1:8. The reaction zone is maintained under sufficient pressure to ensure that the hydrocarbon reactants and alkylation catalysts are in the liquid phase. The temperature of the reaction will vary with the reactants and with the catalysts employed, but generally ranges from between about $-40°$ F. to about $150°$ F.

The invention is best described by reference to the accompanying drawings of which:

Figure 1:
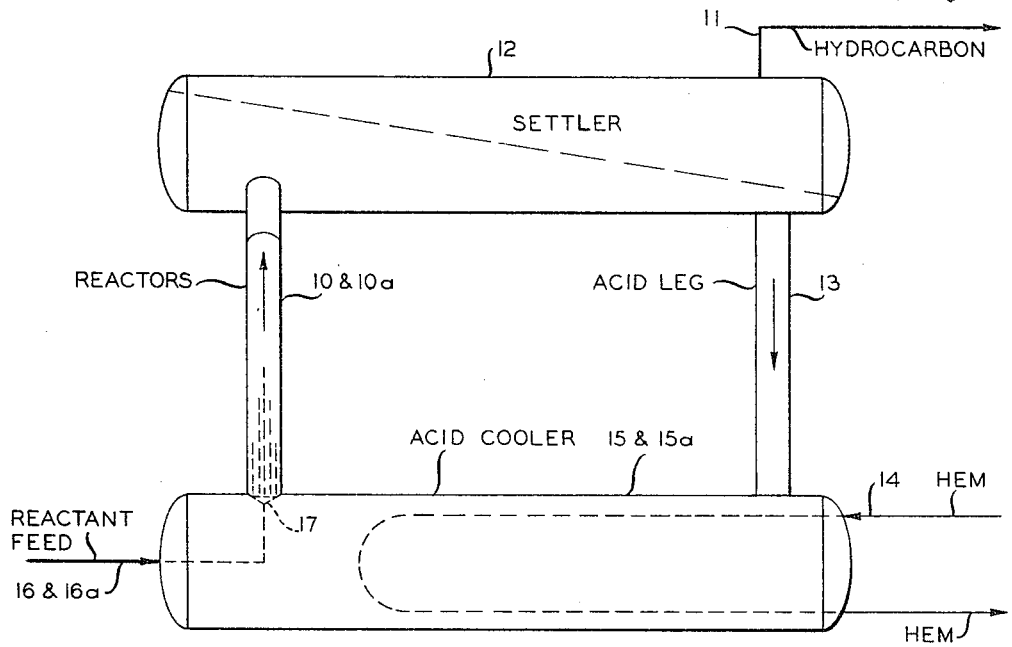
FIGURE 1 is a diagrammatic illustration of a vertical alkylation reactor, effluent settler, and alkylation catalyst cooler provided in an arrangement suitable for carrying out the invention.
Figure 3:
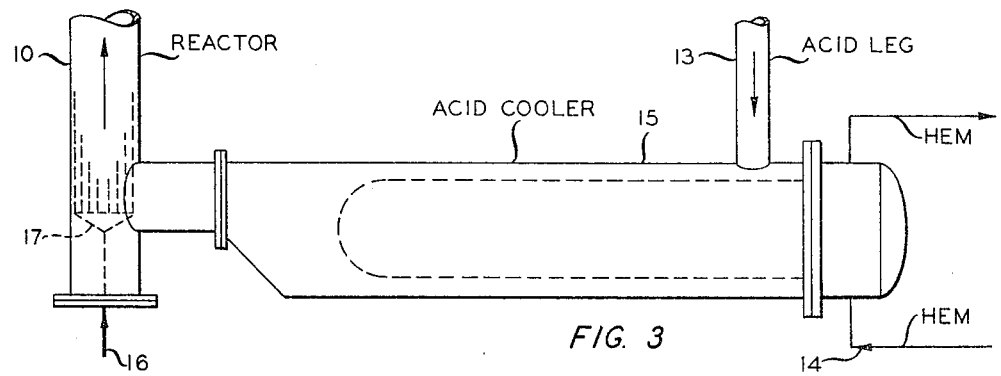

FIGURE 3 is a diagrammatic illustration of a portion of a vertical alkylation reactor, catalyst return leg from an effluent settler (not shown), and an alkylation cooler provided with an external connection to the base of the alkylation reactor and a reactant feed inlet distributor of the invention positioned in a lower portion of the reactor leg; and FIGURES 4–9 are diagrammatic illustrations of various modifications of hydrocarbon feed inlet distributors of the invention useful in the reactors of FIGURES 1 and 3.

Figure 2:
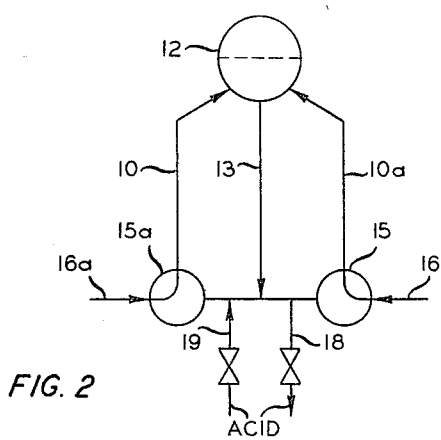
FIGURE 2 is an end view of the apparatus arrangement of FIGURE 1.

Referring to the drawings, especially FIGURES 1–3, vertically elongated tubular reactors 10 and 10a are connected at their inlet ends to acid cooler 15 and their outlet ends with horizontal settler 12 is provided with a take-off line 11 for alkylate (hydrocarbon phase) removal to further processing (fractionation). An acid return conduit 13 connects with the bottom section of settler 12 and with acid coolers 15 and 15a, which are provided with indirect heat exchange tubes 14. The inlet end of reactors 10 and 10a connects with the acid cooler at the opposite end from conduit 13. Reactant hydrocarbon feed lines 16 and 16a for isoparaffin and olefin introduction each connect with a feed inlet distributor 17 leading into the inlet end of tubular reactors 10 and 10a. By this arrangement, injection of feed through feed distributors 17 creates flow of acid into the reactor from acid cooler 15. The feed inlet distributor 17 comprises an eductor-type of means directed upwardly at the juncture of the reaction chamber and the heat exchanger. The injected hydrocarbon in dispersed form passes upwardly through the reaction zone along with upwardly moving catalyst phase. A portion of the acid is removed from the system by way of valved line 18 and passed to an acid rerun unit as desired and acid from the rerun unit and/or fresh acid is returned to the system by way of valved line 19.

FIGURE 3 represents a different type of acid cooler in that the base of tubular reactors 10 and 10a are connected externally to the ends of coolers 15 and 15a. Ready access to reactors 10 and 10a is provided in this embodiment since the feed inlet distributor 17 of the invention can be readily removed from the reactor leg or placed into position in the lower portion of reactors 10 and 10a by removing the flange at the base of reactors 10 and 10a.

The flow through the system shown in FIGURES 1, 2 and 3 is effected by the injection and eductor effect of the feed entering the lower portion of reactors 10 and 10a through feed inlet distributors 17.

Figure 4:
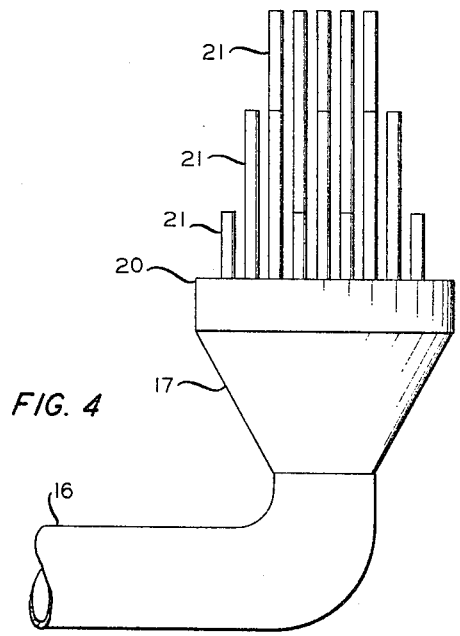
Figure 4A:
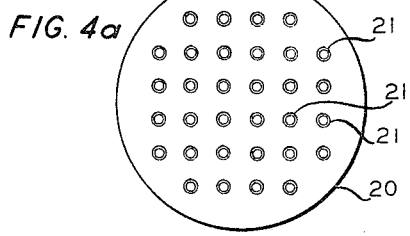
Figure 5A:
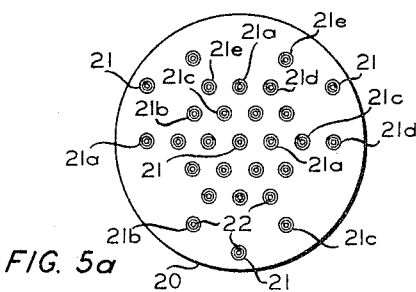
Figure 5B:
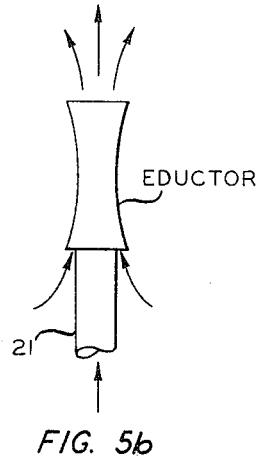
Figure 5:
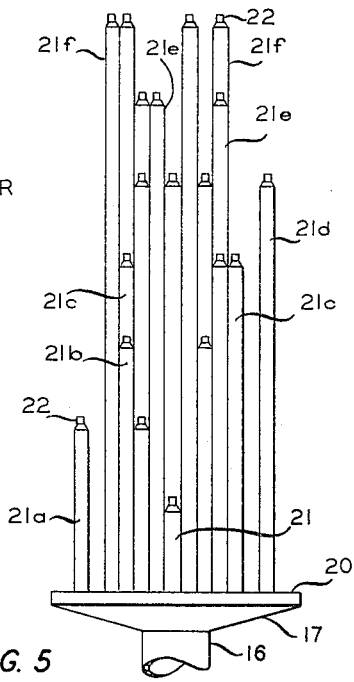

Referring to FIGURES 4 through 9, various other possible forms of the feed inlet distributor of the invention are shown. It will be noted that in all embodiments of the feed inlet distributor the reactant hydrocarbons can be introduced into the reactor at a plurality of spaced-apart points in the directional flow in the reactor. Referring to FIGURES 4–7, in particular, it will be noted that conduit 16, after entering acid cooler 15 or 15a swages outwardly and connects to orifice plate 20 having secured thereto a plurality of tubular elements 21 of small cross-section which terminate within the bottom opening of reactors 10 and 10a. The small diameter or small cross-section tubular elements connected to orifice plate 20 are of different lengths so that reactant feed can be injected into the tubular reactor at a plurality of spaced-apart points. As shown in FIGURES 4 through 7, various arrangements of the tubular elements 21 can be employed in carrying out the invention. For example, in FIGURES 4 and 4a the longest elements 21 are located in the center portion of orifice 20 and the shorter tubular elements 21 are positioned near the perimeter of plate 20. Conduits 21 can be arranged symmetrically on orifice plate 20 or a random distribution of different lengths can be employed. FIGURES 5 and 5a illustrate a feed inlet distributor having a plurality of different length tubular elements that are randomly distributed on orifice plate 20. Moreover, the ends of tubular elements 21 can be either swaged down to a smaller opening (FIGURE 5) or can be a mixing eductor-type tip (FIGURE 5b). A suitable internal mixing eductor that can be used is described in Bulletin 2M, page 10, FIGURE 268(B) of the Schutte and Koerting Company Catalog (copyright 1958).

Figure 6:
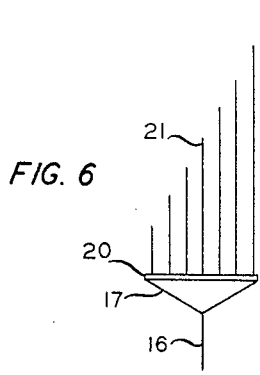
Figure 7:
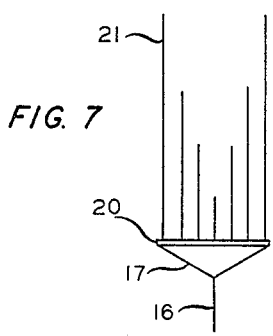

FIGURE 6 illustrates a feed distributor having a stair-step arrangement for tubular elements 21 wherein the shortest members are on one side of plate 20 with the length of the pipes increasing toward the opposite side of the distributor. FIGURE 7 illustrates another embodiment wherein the longest elements 21 are on the outside and the shorter elements are located in the central portion of orifice plate 20. It is also within the scope of the invention to employ tubular elements of different sizes as well as different lengths, either symmetrically disposed on orifice plate or randomly disposed thereon.

Figure 8:
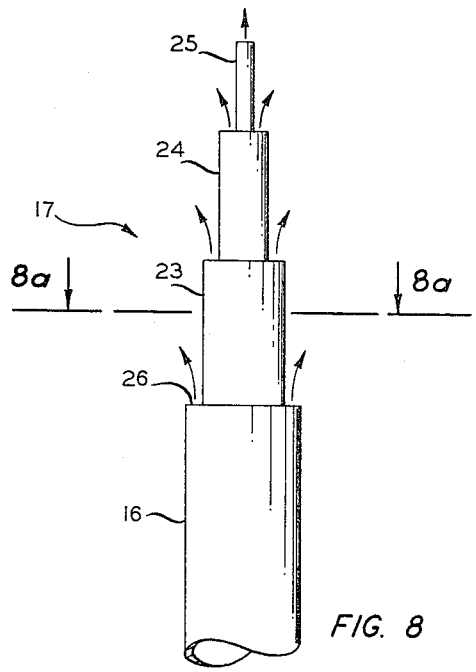
Figure 8A:
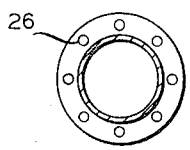
Figure 8B:
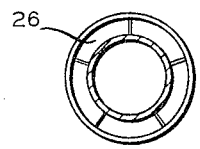

FIGURE 8 illustrates another embodiment of the feed distributor of the invention wherein a plurality of tubular elements of decreasing size are connected to each other to provide openings at the junctures of the different tubular elements. As shown in FIGURE 8 conduit 16 is connected to a smaller conduit 23, which in turn is connected to a smaller conduit 24, which in turn is connected to smaller conduit 25. Reactant entering conduit 16 can be injected into reactor 10 under plurality as spaced-apart points. Openings 26 in FIGURE 8 can be orifices as shown in FIGURE 8a or an annulus as shown in FIGURE 8b. The openings at the different junctures can be the same or different sizes depending upon the desired rate of reactant introduction at the various spaced points.

Figure 9:
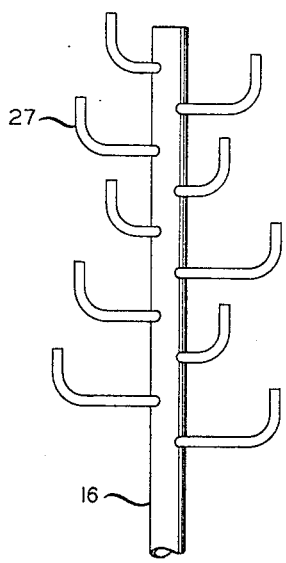
Figure 9A:
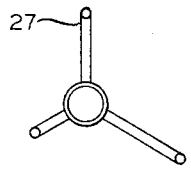

FIGURE 9 shows a further embodiment wherein the plurality of L-shaped conduits 27 are connected to inlet conduit 16 so as to direct reactant upwardly and at a plurality of spaced-apart points. Again, the openings for the L-shaped elements 27 can be the same size or different size, as desired, and the lengths of each pipe 27 can vary also as exemplified by FIGURE 9a.

One feed inlet distributor that has been successfully employed for introducing reactant hydrocarbons into an alkylation reactor is similar to that shown in FIGURE 4 and was made up of the following elements. Feed inlet pipe 16 was a 6-inch pipe and which connected (welded) to a swage enlarging to 16 inches O.D. Connected (welded) to the large end of the swage was orifice plate 20 containing 32 ⅜6-inch diameter orifices. Connected (welded) to orifice plate 20 was 32 ¼-inch pipes varying in length from 4 inches to 16 inches. Eight of the ¼-inch pipes were 4 inches long and these were positioned near the perimeter of orifice plate 20. Twelve of the ¼-inch pipes were 10 inches long and these were positioned inside the 4 inch long pipes. The longer pipes were 16 inches long and were disposed in the central portion of orifice plate 20. The pipes were disposed on orifice plate 20 on 2-inch centers.

Another feed inlet distributor that has been employed successfully for introducing reactants into an alkylation reactor comprised a feed distributor 17 similar to that shown in FIGURE 5. The pipes 21 were ½ inch in diameter and were provided with ⅜-inch tips 22 and the pipes varied in length from 6 inches to 42 inches, each group being 6 inches longer than the preceding shorter group. The pipes of various lengths were randomly disposed on orifice plate 20. It has been found that even distribution of reactant feed can be achieved over the entire cross-sectional area of the reactor and over a substantial length of the reactor by utilizing the feed-inlet distributors of the invention, particularly as described above in connection with FIGURES 4 and 5.

By the practice of the invention, isoparaffin and olefin are introduced at a plurality of spaced points in the direction of flow along an elongated reaction zone with a mole ratio of reactant paraffin to olefin of at least about 10:1, or more, at the inlet end of the reaction zone and with successively higher ratios of these reactants at subsequent points of addition of the alkylation reactants, the highest ratio being 100:1 or more. Thus, for example, assuming a 14:1 mole ratio of isoparaffin to olefin in the feed and one mole of each reactant reacting at each feed point, the mole ratio of reactants at the first outlet or feed point is 14:1, the second outlet 27:1, the third outlet 40:1, the fourth outlet 53:1, etc., along the line of flow in the reactor. A further advantage of the invention lies in the fact that by the use of the invention alkylation is carried out at a point at which there is a very high proportion of isoparaffin to olefin, a condition favorable to alkylation in that it tends to suppress undesirable side reactions such as polymerization, thus resulting in an increased yield of higher octane rating alkylate product. Moreover, by the practice of the invention, very little propane is made during alkylation and at the same time a higher quality alkylate is obtained due to an increased content of high octane trimethyl pentanes and a decreased content of lower octane dimethyl hexanes and methyl heptane.

Certain modifications of the invention will become apparent to those skilled in the art and the illustrative details disclosed are not to be construed as imposing unnecessary limitations on the invention.

I claim:
1. Apparatus for alkylating isoparaffins with olefins comprising in combination:
   an elongated tubular reaction chamber free of indirect heat exchange means having an inlet for acid in its upstream end;
   a settler connected with the downstream end of said reaction chamber, said settler having an outlet for alkylate in an upper section thereof and an outlet for acid in a lower section thereof;
   a heat exchanger connected to the upstream end of said reaction chamber and to the acid outlet of said settler, said reaction chamber, settler and heat exchanger forming a closed, continuous circuit for flow; and
   a feed inlet distributor means for introducing reactant hydrocarbons into the upstream end of said reaction chamber substantially downstream from the point of introduction of catalyst into said reactor, said distributor comprising a conduit connected to a source of hydrocarbon, a header having an enlarged outlet end connected to said conduit, and a plurality of orifice openings spaced apart in the direction of flow in said reaction chamber so that reactant feed is introduced into the reaction zone at a plurality of spaced points along the length of the reactor to provide a consistently optimum reactant ratio throughout the length of said reactor.

2. The apparatus of claim 1 wherein:
   said reaction chamber is upright with the upstream end at the bottom;
   said settler is at a level adjacent the downstream end of said reaction chamber;
   said heat exchanger is horizontally disposed and joined directly at its downstream end to the upstream end of said reaction chamber;
   said feed distributor for introducing reactants being positioned at the juncture of said chamber and heat exchanger and comprises a plurality of small diameter tubular elements of different lengths adapted to introduce reactants upwardly at spaced points in the direction of flow in said chamber.

3. The apparatus of claim 1 wherein:
   said feed distributor comprises a conduit, which is connected to a source of reactants, directed upwardly into the lower portion of said reaction chamber;
   a swage connected at its smallest end to the outlet end of said conduit;
   an orifice plate containing a plurality of orifices connected to the large end of said swage;
   and a plurality of small diameter conduits connected to the orifices and extending into the reaction chamber toward the downstream end of said chamber, said conduits being of at least two different lengths so that reactants can be introduced into said chamber at a plurality of spaced-apart points in the direction of flow in said reaction chamber.

References Cited by the Examiner

UNITED STATES PATENTS

| | | | |
|---|---|---|---|
| 2,386,681 | 10/1945 | Hadden | 260—683.48 |
| 2,635,989 | 4/1953 | Bonner | 208—146 |
| 2,720,447 | 10/1955 | Jones et al. | 260—683.58 |
| 2,775,636 | 12/1956 | Rupp | 260—683.48 |
| 2,846,369 | 8/1958 | Halik | 208—165 |
| 3,006,739 | 10/1961 | Van Pool | 260—683.48 |
| 3,014,861 | 12/1961 | Buningh | 208—287 |
| 3,080,438 | 3/1963 | Sailors | 260—683.48 |
| 3,108,048 | 10/1963 | McDonald | 260—683.58 |

FOREIGN PATENTS 640,683    5/1962    Canada.

DELBERT E. GANTZ, *Primary Examiner.*
ALPHONSO D. SULLIVAN, *Examiner.*
C. R. DAVIS, R. H. SHUBERT, *Assistant Examiners.*